(12) United States Patent
George et al.

(10) Patent No.: US 11,286,417 B2
(45) Date of Patent: Mar. 29, 2022

(54) PENETRATING COMPOSITIONS WITH REDUCED CLOUD POINT FOR ACIDIZING APPLICATIONS

(71) Applicant: Halliburton Energy Services, Inc., Houston, TX (US)

(72) Inventors: Shoy Chittattukara George, Thrissur (IN); Antonio Recio, III, Humble, TX (US); Rahul Chandrakant Patil, Pune (IN); Jason Maxey, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 233 days.

(21) Appl. No.: 16/533,228

(22) Filed: Aug. 6, 2019

(65) Prior Publication Data
US 2021/0040378 A1 Feb. 11, 2021

(51) Int. Cl.
| | | |
|---|---|---|
| C09K 8/60 | (2006.01) |
| C09K 8/68 | (2006.01) |
| E21B 43/26 | (2006.01) |
| C09K 8/74 | (2006.01) |
| E21B 43/24 | (2006.01) |
| C09K 8/64 | (2006.01) |

(52) U.S. Cl.
CPC .............. C09K 8/602 (2013.01); C09K 8/64 (2013.01); C09K 8/68 (2013.01); C09K 8/74 (2013.01); E21B 43/24 (2013.01); E21B 43/26 (2013.01)

(58) Field of Classification Search
None
See application file for complete search history.

(56) References Cited

U.S. PATENT DOCUMENTS

| | | |
|---|---|---|
| 4,541,935 A | 9/1985 | Constien et al. |
| 7,318,477 B2 | 1/2008 | Hou |
| 8,586,520 B2 | 11/2013 | Habeeb et al. |
| 9,499,735 B2 | 11/2016 | Vo et al. |
| 9,969,925 B2 | 5/2018 | Zhang |
| 2008/0287324 A1 | 11/2008 | Pursley et al. |
| 2014/0096969 A1 | 4/2014 | Ali et al. |
| 2014/0367107 A1* | 12/2014 | Hill .................. C09K 8/26 166/305.1 |
| 2016/0177162 A1 | 6/2016 | Nguyen et al. |

OTHER PUBLICATIONS

PCT Application No. PCT/US2019/045286 , "International Search Report and Written Opinion", dated May 7, 2020, 12 pages.

* cited by examiner

*Primary Examiner* — Jeffrey D Washville
(74) *Attorney, Agent, or Firm* — Kilpatrick Townsend & Stockton LLP

(57) ABSTRACT

Described herein are penetrating compositions that include ethoxylated C12-C16 alcohols, 2-ethyl hexanol, and isopropyl alcohol, and are injectable into a near-wellbore subterranean formation. The penetrating compositions may include water or brine. The penetrating compositions are free of ethylene glycol monobutyl ether (EGMBE) and nonylphenol ethoxylates (NPE). Also described are methods of using penetrating compositions that that include introducing a penetrating composition into a near-wellbore formation and reducing surface tension at an oil/water interface within the formation.

20 Claims, 3 Drawing Sheets

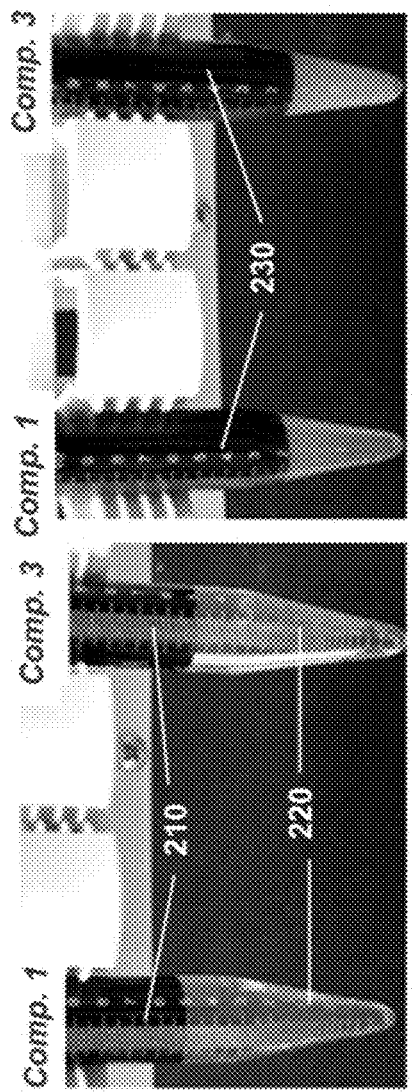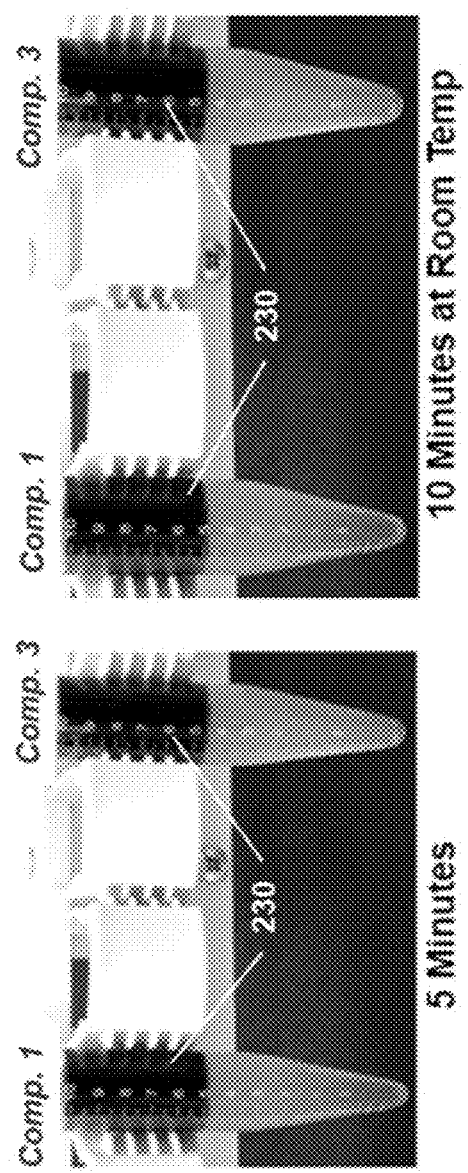

PENETRATING COMPOSITIONS WITH REDUCED CLOUD POINT FOR ACIDIZING APPLICATIONS

FIELD

The present disclosure relates generally to surfactant compositions used in wellbore operations. More specifically, but not by way of limitation, this disclosure relates to penetrating compositions suitable for acidic and/or high temperature conditions in wellbore operations.

BACKGROUND

Plugging a wellbore may slow or cease production from a well. Stimulation treatments may be used in wellbore operations to maintain, restore, or enhance the productivity of a formation. Stimulation treatments may include acid, solvent, and chemical treatments. The interfacial tension at the air/water or oil/water interface in the formation can impact the operating conditions and the effectiveness of the stimulation treatments. Surfactant compositions known as penetrating agents can reduce the surface tension at the interface and reduce the pressure necessary to inject the stimulation treatments into the formation. The decrease in operating pressure can enable aqueous stimulation fluids to penetrate into the formation, increase the relative permeability of the formation to oil, facilitating the displacement of oil at lower pump pressures.

Conventional penetrating agent compositions have temperature and pH limitations and can include ethylene glycol monobutyl ether (EGMBE) or nonylphenol ethoxylates (NPE). Strict environmental and health regulations adopted in some regions have limited the use of EGMBE and NPE in wellbore operations. The cloud point and/or performance of conventional penetrating agent compositions at low pH conditions can limit their use in certain climates or formation types that utilize acidic stimulation treatments.

BRIEF DESCRIPTION OF THE DRAWINGS

FIGS. 3A, 3B, 3C, and 3D are side views of an emulsion break test in an acid solution for penetrating compositions according to examples of the present disclosure.

DETAILED DESCRIPTION

Figure 1A:
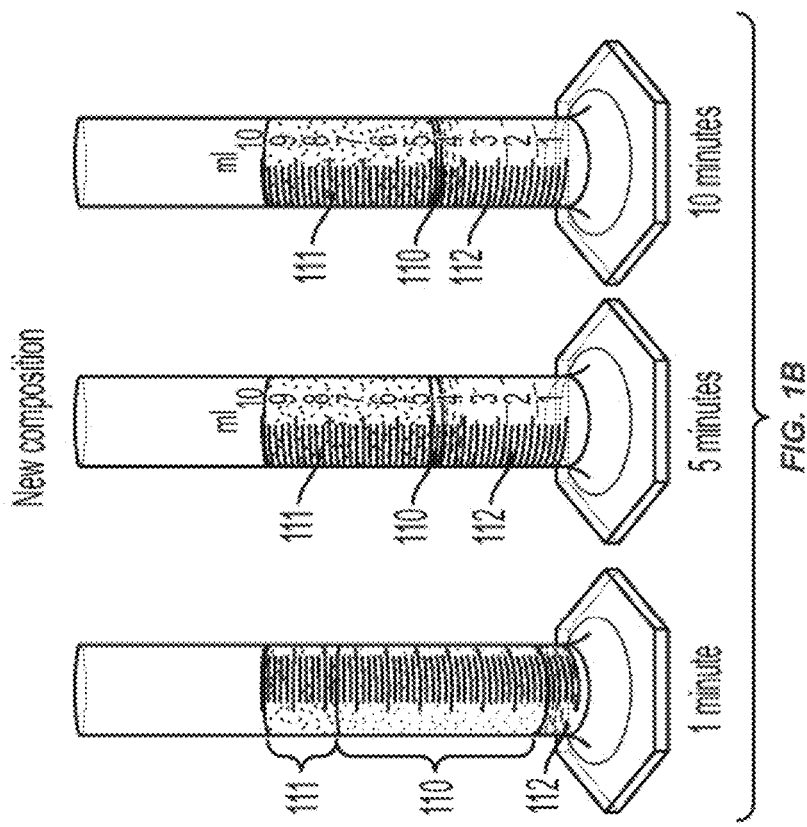
FIGS. 1A and 1B are side views of an emulsion break test in deionized water for a comparative penetrating composition and a penetrating composition according to one example of the present disclosure.

Certain aspects and features of the present disclosure relate to penetrating compositions that are injectable into a near-wellbore formation and associated methods of injecting these penetrating compositions. Penetrating compositions can include one or more surfactants to reduce the surface tension at an air/water or water/oil interface and reduce the pressure necessary to inject stimulation treatments into a near-wellbore formation. Described herein are penetrating compositions that include ethoxylated C12-C16 alcohols, 2-ethyl hexanol, and isopropyl alcohol. The penetrating compositions may include water or brine. The penetrating compositions are free of ethylene glycol monobutyl ether (EGMBE) and nonylphenol ethoxylates.

In some examples, the disclosed penetrating compositions have a reduced cloud point and are effective in acidizing applications. Cloud point is the temperature at which a liquid begins to cloud or haze upon cooling and can indicate the beginning of solidification. The penetrating composition described herein includes a blend of surfactants that can form a stable dispersion that does not separate into mutually insoluble phases when added to a neutral or acidic fluid.

In some examples, the penetrating composition includes about 25 to about 55 weight percent ethoxylated C12-C16 alcohols, about 8 to about 12 weight percent 2-ethyl hexanol, about 18 to about 55 weight percent isopropyl alcohol, and up to about 35 weight percent water.

In some examples, the penetrating composition includes about 25 to about 45 weight percent polyoxyethylene (6) C12-C16, about 8 to about 12 weight percent 2-ethyl hexanol, about 18 to about 55 weight percent isopropyl alcohol, up to about 10 weight percent ethoxylated C12 alcohol or polyoxyethylene (4) lauryl ether, and up to about 35 weight percent water.

Surfactants such as ethoxylated alcohols can form stable emulsions. Ethoxylated alcohols are also known as polyoxyethylene (POE) alkyl ethers, and have a general formula of HO—$(CH_2CH_2O)_n$—$(CH_2)_m$—$CH_3$, where n is the number of ethyleneoxide (EO) units, and m is the length of the alkyl chain. Naming conventions vary and multiple names are recognized for a single alkyl compound. For example, a 12-carbon straight chain alcohol may be referred to as dodecyl alcohol, dodecanol, lauryl alcohol, or C12 alcohol. As used herein, C12 is lauryl or dodecyl, C14 is tetradecyl, and C16 is hexadecyl. The naming of POE alkyl ethers may also include the number of moles of EO incorporated into the POE. For example, POE (6) includes 6 moles of EO and POE (4) lauryl ether includes 4 moles of EO.

The penetrating compositions disclosed herein may include about 25 wt. % to about 55 wt. % ethoxylated C12-C16 alcohols. For example, the penetrating composition may include about 25 wt. %, 26 wt. %, 27 wt. %, 28 wt. %, 29 wt. %, 30 wt. %, 31 wt. %, 32 wt. %, 33 wt. %, 34 wt. %, 35 wt. %, 36 wt. %, 37 wt. %, 38 wt. %, 39 wt. %, 40 wt. %, 41 wt. %, 42 wt. %, 43 wt. %, 44 wt. %, 45 wt. %, 46 wt. %, 47 wt. %, 48 wt. %, 49 wt. %, 50 wt. %, 51 wt. %, 52 wt. %, 53 wt. %, 54 wt. %, or 55 wt. % ethoxylated C12-C16 alcohols. In certain examples, the composition includes C12-C16 POE (6) in an amount of about 40 wt. %.

The ethoxylated C12-C16 alcohols may include POE lauryl ether or optionally, POE (4) lauryl ether. In certain examples, the composition includes up to about 10 wt. % POE lauryl ether. For example, the penetrating composition may include about 0 wt. %, 1 wt. %, 1.5 wt. %, 2 wt. %, 2.5 wt. %, 3 wt. %, 3.5 wt. %, 4 wt. %, 4.5 wt. %, 5 wt. %, 5.5 wt. %, 6 wt. %, 6.5 wt. %, 7 wt. %, 7.5 wt. %, 8 wt. %, 8.5 wt. %, 9 wt. %, 9.5 wt. %, or 10 wt. % POE lauryl ether.

The ethoxylated C12-C16 alcohols may include C12-C16 POE (6) and POE (4) lauryl ether. Optionally the composition may include ethoxylated alcohols of C10 or less, C12, C14, C16, or combinations thereof. For example, a surfactant blend may include C12, C14, and C16 ethoxylated alcohols. Example blends that may be used in the penetrating compositions are shown in Table 1. All values are wt. %.

TABLE 1

| Hydrophobe | | Blend 1 | Blend-2 | Blend-3 | Blend-5 | Blend-6 |
|---|---|---|---|---|---|---|
| C10 and lower | % | 1 | 2 | 2 | 0 | 0 |
| C12 | % | 98 | 60-66 | 65-74 | 65-71 | 70-76 |
| C13 | % | 0 | 0 | 0 | 0 | 0 |
| C14 | % | 1 | 21-27 | 21-28 | 23-30 | 24-30 |
| C15 | % | 0 | 0 | 0 | 0 | 0 |
| C16 | % | 0 | 8-12 | 4-10 | 4-8 | 0 |
| EO | Moles | 4 | 4 | 4 | 4 | 4 |

The penetrating compositions disclosed herein may include about 8 wt. % to about 12 wt. % of 2-ethyl hexanol. For example, the penetrating composition may include about 8 wt. %, 8.5 wt. %, 9 wt. %, 9.5 wt. %, 10 wt. %, 10.5 wt. %, 11 wt. %, 11.5 wt. %, or 12 wt. % of 2-ethyl hexanol.

The penetrating compositions disclosed herein may include about 18 wt. % to about 55 wt. % of isopropyl alcohol. For example, the penetrating composition may include about 18 wt. %, 19 wt. %, 20 wt. %, 21 wt. %, 22 wt. %, 23 wt. %, 24 wt. %, 25 wt. %, 26 wt. %, 27 wt. %, 28 wt. %, 29 wt. %, 30 wt. %, 31 wt. %, 32 wt. %, 33 wt. %, 34 wt. %, 35 wt. %, 36 wt. %, 37 wt. %, 38 wt. %, 39 wt. %, 40 wt. %, 41 wt. %, 42 wt. %, 43 wt. %, 44 wt. %, 45 wt. %, 46 wt. %, 47 wt. %, 48 wt. %, 49 wt. %, 50 wt. %, 51 wt. %, 52 wt. %, 53 wt. %, 54 wt. %, or 55 wt. % of isopropyl alcohol.

The penetrating compositions disclosed herein may optionally include up to about 35 wt. % of water or brine. For example, the penetrating composition may include about 1 wt. %, 2 wt. %, 3 wt. %, 4 wt. %, 5 wt. %, 6 wt. %, 7 wt. %, 8 wt. %, 9 wt. %, 10 wt. %, 11 wt. %, 12 wt. %, 13 wt. %, 14 wt. %, 15 wt. %, 16 wt. %, 17 wt. %, 18 wt. %, 19 wt. %, 20 wt. %, 21 wt. %, 22 wt. %, 23 wt. %, 24 wt. %, 25 wt. %, 26 wt. %, 27 wt. %, 28 wt. %, 29 wt. %, 30 wt. %, 31 wt. %, 32 wt. %, 33 wt. %, 34 wt. %, 35 wt. % of water or brine. In some cases, the composition may be substantially free of water or brine.

In some examples, the penetrating composition includes 35 to 40 weight percent ethoxylated C12-C16 alcohols, 8 to 12 weight percent 2-ethyl hexanol, 20 to 32 weight percent isopropyl alcohol, and 22 to 34 weight percent water. In certain examples, the ethoxylated C12-C16 alcohols include 28 to 33 weight percent C12-C16 polyoxyethylene (6) and 8 to 10 weight percent polyoxyethylene (4) lauryl ether.

The penetrating compositions are free (or at least substantially free) of EGMBE and nonylphenol ethoxylates (NPE), which are included in some conventional penetrating compositions. Examples of penetrating compositions as described herein are provided in Table 2. All values are wt. %.

TABLE 2

| | Ex. 1 | Ex. 2 | Ex. 3 | Ex. 4 | Ex. 5 | Ex. 6 | Ex. 7 |
|---|---|---|---|---|---|---|---|
| C12-C16 (POE)6 | 30 | 30 | 30 | 30 | 37.5 | 0 | 0 |
| 2-ethyl hexanol | 10 | 10 | 10 | 10 | 10 | 10 | 10 |
| POE Lauryl Ether | 7.5 | 7.5 | 7.5 | 7.5 | 0 | 0 | 0 |
| IPA | 25 | 20 | 30 | 50 | 30 | 25 | 25 |
| Water | 27.5 | 32.5 | 22.5 | 2.5 | 22.5 | 27.5 | 27.5 |
| Blend 1 | 0 | 0 | 0 | 0 | 0 | 7.5 | 0 |
| Blend 2 | 0 | 0 | 0 | 0 | 0 | 30 | 0 |
| Blend 5 | 0 | 0 | 0 | 0 | 0 | 0 | 37.5 |
| EGMBE | 0 | 0 | 0 | 0 | 0 | 0 | 0 |
| NPE | 0 | 0 | 0 | 0 | 0 | 0 | 0 |

The sum of the weight percentages of all components in the penetrating composition is 100 weight percent. In some cases, the sum of the maximum ranges exceeds 100 weight percent; however, in no case is every component at the maximum stated range such that the total weight percentage is greater than 100 weight percent. Similarly, in no case is every component at the minimum stated range such that the total weight percentage is less than 100 weight percent.

Penetrating compositions can enable aqueous stimulation fluids, such as acids, to penetrate a formation by increasing the relative permeability of the formation. In some cases, the penetrating composition can increase matrix penetration of breakdown acids used prior to acidizing treatments, and increase energy efficiency of well bore operations.

In some examples, the penetrating composition may be stable in acidic conditions, such as those found during acidizing treatments to remove buildup from a wellbore or formation. In some cases, the penetrating composition may be stable at a pH less than 2.0 (e.g., less than 1.5 or less than 1.0).

The penetrating composition may be stable at elevated temperatures, such as those found in wellbore operations. In some cases, the penetrating composition may be stable at temperatures greater than 90° C. In some cases, the penetrating composition may be stable at temperatures up to 175° C. (e.g., up to 100° C., up to 125° C., or up to 150° C.).

In some examples, the penetrating composition may be stable in acidic conditions at elevated temperatures. The penetrating composition may be stable at a pH less than 2.0 and at temperatures up to 175° C. In certain examples, the penetrating composition may be stable at a pH less than 1.0 and at temperatures up to 175° C.

The penetrating composition may have a low cloud point enabling use of the composition in regions having lower temperatures. For example, ambient conditions in the North Sea are much cooler than other oil-rich regions and require compositions that can be stable when stored at low temperatures, below −10° C. In some examples, the composition remains clear and has cloud point below −10° C. In certain examples, the cloud point is below −12° C.

Further benefits include the absence of EGMBE and NPE, which make the compositions a viable option for regions, including North Sea, UK, and Australia, that have strict environmental and safety regulations that limit or ban the use of EGMBE and/or NPE. The removal of EGMBE and utilization of IPA also has an added benefit of decreasing operating costs. IPA ranges in cost from $0.5/kg to $1.0/kg, while EGMBE ranges in cost from $1.75/kg to $2.5/kg.

The methods described herein may further include methods of using the penetrating compositions described herein. Methods may include introducing a penetrating composition into a near-wellbore formation and reducing surface tension at an oil/water interface within the formation. In some examples, methods of using the composition may include adding a penetrating agent including ethoxylated C12-C16 alcohols, 2-ethyl hexanol, and isopropyl alcohol to a carrier fluid to form a treatment fluid, introducing the treatment fluid into a near-wellbore formation, and reducing the surface tension at an oil/water interface within the formation. In certain examples, methods can further include reducing or preventing water-in-oil emulsion formation during stimulation applications.

In certain examples, the ethoxylated C12-C16 alcohols include 25 to 45 weight percent C12-C16 polyoxyethylene (6). Optionally, the ethoxylated C12-C16 alcohols may include up to 10 weight percent polyoxyethylene (4) lauryl ether. The composition may be substantially free of EGMBE and NPE. The carrier fluid may include water, brine, a hydrocarbon fluid, or an acidic solution. The acidic solution may be a hydrochloric acid solution or a hydrofluoric acid solution.

In some examples, the temperature of the treatment fluid is up to 175° C. The treatment fluid may have a pH less than 2.0 or less than 1.0. In certain examples, the treatment fluid may have a temperature up to 175° C. and pH less than 2.0.

The present disclosure in some embodiments provides methods for using the treatment fluids to carry out a variety of subterranean treatments, including but not limited to, acidizing and other stimulation treatments. In certain embodiments, a treatment fluid may be introduced into a subterranean formation. In some embodiments, the treatment fluid may be introduced into a wellbore that penetrates a subterranean formation.

EXAMPLES

Example 1: Cloud Point

Samples of penetrating compositions having the compositions of Examples 1-3 as disclosed in Table 2 were prepared and samples of conventional penetrating compositions (Convention Composition A and Conventional Composition B) were obtained. The conventional compositions each include NPE and/or EGMBE. The samples were placed in test tubes, and then placed inside a chiller for cloud point analysis. The chiller was initially set to −10° C. Approximately 90 minutes after the chiller set temperature was reached, turbidity observations were periodically made for each sample. Development of any haziness or turbidity was noted as the cloud point. If the test tube sample remained clear, the chiller set point was reduced by 2° C. and observations resumed. Table 3 shows the cloud point measurements for samples of Conventional Composition A, Conventional Composition B, and the test samples of Compositions 1-3.

TABLE 3

|  | Cloud Point (° C.) |
| --- | --- |
| Conventional Composition A | 4 |
| Conventional Composition B | 12.5 |
| Composition 1 (Ex. 1) | −12.8 |
| Composition 2 (Ex. 2) | −8.8 |
| Composition 3 (Ex. 3) | −11.5 |

The cloud point for Composition 2 is below 0° C. and the cloud point of Compositions 1 and 3 is below −10° C., which indicate stability of the compositions in colder climates, such as for North Sea operations.

Example 2: Surface Tension

Samples of penetrating compositions having the compositions of Examples 1-3 as disclosed in Table 2 were prepared and samples of conventional penetrating compositions (Convention Composition A and Conventional Composition C) were obtained. The conventional compositions each include NPE and/or EGMBE. Kruss100 (whilhelmy plate method) was used to test the surface tension of the samples at a concentration of 0.1 wt. % in DI. The resulting measurements were compared to the surface tension measurement for DI water. Table 4 shows the surface tension measurements for samples of Conventional Composition A, Conventional Composition C, test samples of Compositions 1-3, and DI water.

TABLE 4

|  | Surface Tension (mN/m) |
| --- | --- |
| DI water | 72 |
| Conventional Composition A | 31.2 |
| Conventional Composition C | 35 |
| Composition 1 (Ex. 1) | 26.8 |
| Composition 2 (Ex. 2) | 27.1 |
| Composition 3 (Ex. 3) | 27.5 |

All penetrating compositions reduced the surface tension from the baseline of 72 mN/m. The largest reduction was observed with Composition 1.

Example 3: Stability Tests

Samples of penetrating compositions having the compositions of Examples 1-3 as disclosed in Table 2 were prepared and samples of conventional penetrating compositions (Convention Composition A and Conventional Composition C) were obtained. The conventional compositions each include NPE and/or EGMBE. Test samples at 0.1% composition in DI water and 0.1% composition in 15% HCl solution were prepared. Each sample was shaken well for one minute and placed in a heated water bath (200° F.) for approximately 25 minutes. Once removed from the bath, the samples were allowed to cool at ambient conditions. Surface tension measurements were performed on the cooled samples. The acid samples were neutralized to a pH of 7-8 prior to measuring surface tension.

High pressure, high temperature (HPHT) studies were conducted to determine stability at elevated temperature and pressure conditions. Samples with 1.0% composition in 15% HCl solution were prepared and added to a Parr cell reactor. The reactor cell was pressurized to 500 psi and then heated to 350° F. (175° C.). Once at the final temperature of 350° F. and 850 psi, the solutions were held for 1 hour. Samples was obtained from the Parr cell reactor at temperature (350° F.) and diluted to 0.1 wt. % for surface tension measurement.

If a penetrating composition is not stable in acid and/or at elevated temperature/pressure, the surface tension values of the solution will significantly increase. Table 5 shows the surface tension measurements for samples of Conventional Composition A, Conventional Composition C, and test samples of Compositions 1-3.

TABLE 5

|  | Surface tension after heat treat (mN/m) | | |
| --- | --- | --- | --- |
|  | 0.1% in DI water | 0.1% in 15% HCl | 0.1% in 15% HCl (350° F.) |
| Conventional Composition A | 31.2 | 35.2 | — |
| Conventional Composition C | 35 | 37.7 | 35.6 |
| Composition 1 (Ex. 1) | 26.8 | 26.7 | 27.4 |
| Composition 2 (Ex. 2) | 27.1 | 27.3 | 27.5 |
| Composition 3 (Ex. 3) | 27.5 | 28.7 | 28.5 |

All penetrating compositions reduced the surface tension from the baseline of 72 mN/m and showed no increased for DI water samples heated to 200° F. Each of the acidic solution samples showed a small increase in surface tension, but were still reduced over the baseline surface tension of DI water, indicating that each would be effective in acidic conditions. The results at HPHT were stable or only slightly increased over the atmospheric testing in acid. Composition 1 demonstrated the least amount of increase in surface tension as compared to the comparison compositions; however, each of Compositions 1-3 exhibited reduced surface tension.

Example 4: Emulsion Break Tests

Figure 1B:
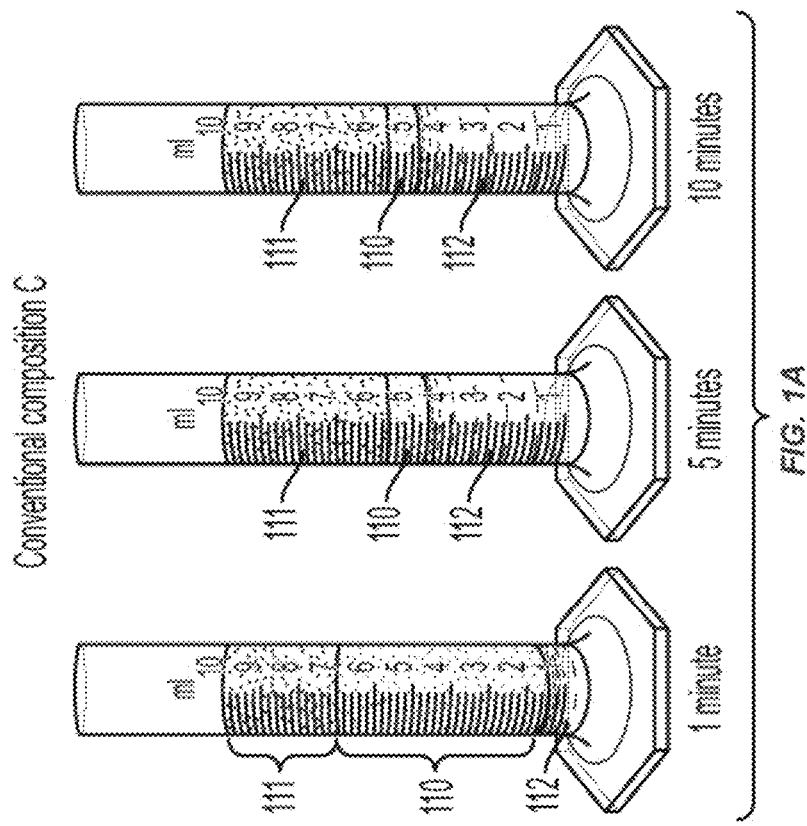

Emulsion Break Tests were performed to evaluate the effectiveness of the penetrating compositions described herein in forming a clear separation between an oil and water. A sample of a penetrating composition having the composition of Example 3 as disclosed in Table 2 was prepared and a sample of a Conventional Composition C was obtained. Test samples at 0.1% composition in DI water and 0.1% composition in 15% HCl solution were prepared. A ten mL graduated cylinder was used to observe emulsion break performance. Five mL of a test solution was added to a graduated cylinder. Five mL of crude oil was then added to the cylinder with penetrating composition, taking care not to disturb the aqueous layer. Each cylinder was capped and shaken well for 30 seconds and placed in a heated water bath (160° F.) and observed. FIGS. 1A and 1B show the emulsion break test conducted in DI water. Observations were made at one minute, five minutes, and ten minutes after mixing. At one minute, the height of the emulsion layer 110 is larger than the oil layer 111 or water layer 112. The height of the emulsion layer 110 decreases in each sample with time. After ten minutes, the height of the emulsion layer 110 of Composition 3 is much smaller than the height of the emulsion layer 110 of Conventional Composition C, indicating that Composition 3 performed better at breaking the emulsion in DI water.

Figure 2A:
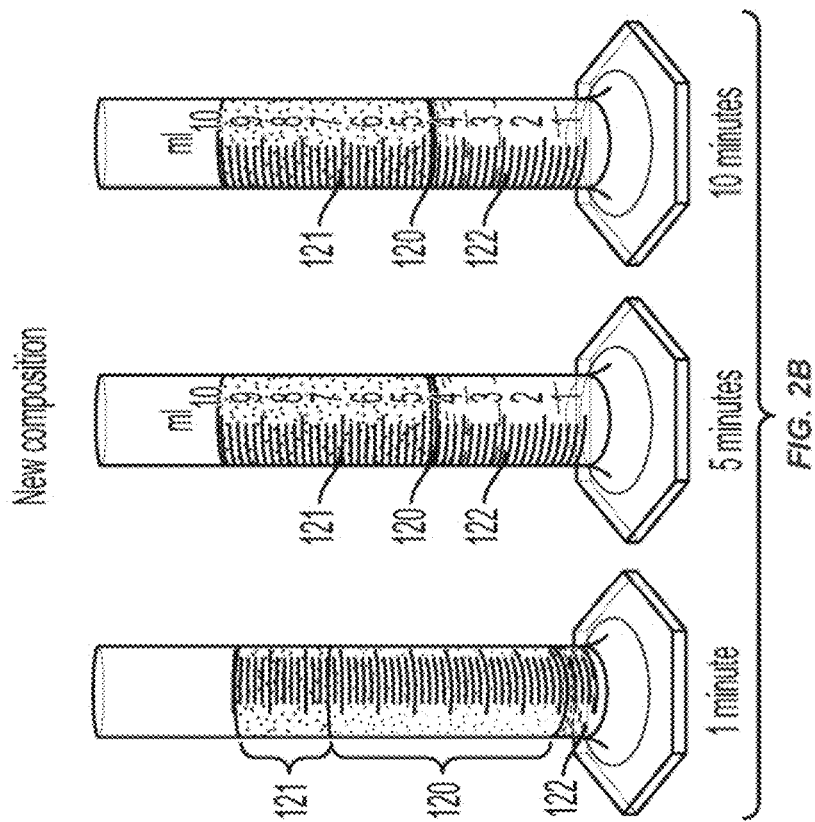
FIGS. 2A and 2B are side views of an emulsion break test in an acid solution for a comparative penetrating composition and a penetrating composition according to one example of the present disclosure.
Figure 2B:
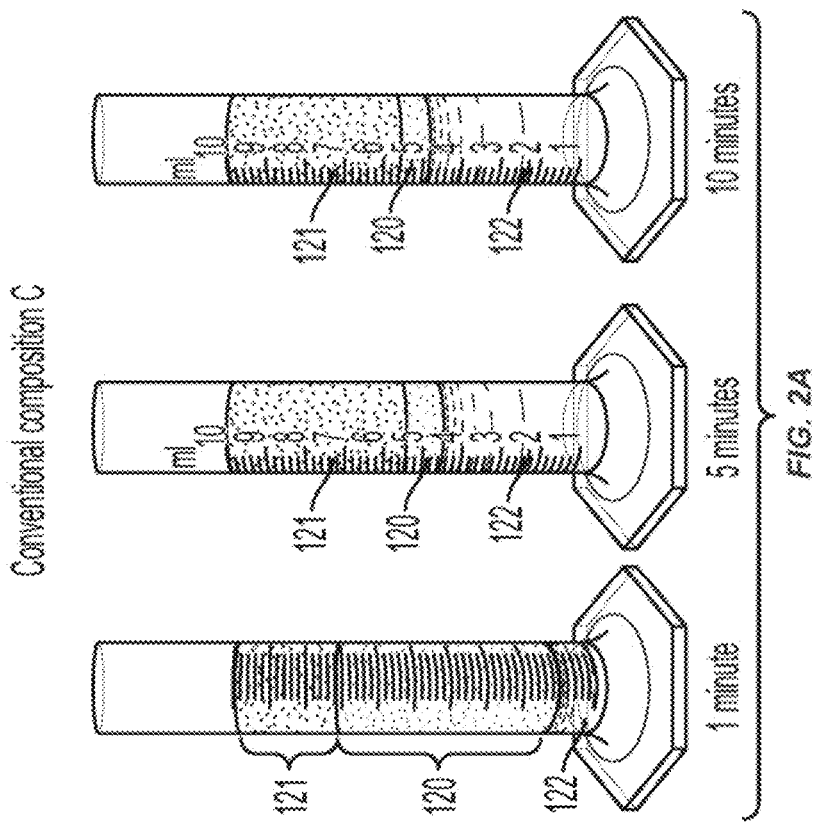

FIGS. 2A and 2B show the emulsion break test conducted in the 15% HCl solution. Observations were made at one minute, five minutes, and ten minutes after mixing. At one minute, the height of the emulsion layer 120 is larger than the oil layer 121 or acid layer 122. The height of the emulsion layer 120 decreases in each sample with time. After ten minutes, the height of the emulsion layer 120 of Composition 3 is much smaller than the height of the emulsion layer 120 of Conventional Composition C, indicating that Composition 3 performed better at breaking the emulsion in the acid solution. The emulsion break of Composition 3 is superior to Conventional Composition C in acid conditions, with virtually no emulsion layer 120 remaining in the Composition 3 sample.

Samples of penetrating compositions having the compositions of Examples 1 and 3 as disclosed in Table 2 were prepared for emulsion break testing after aging. FIGS. 3A to 3D show an emulsion break test conducted in a 15% HCl solution after the samples were aged for one hour at HPHT conditions of 350° F. and 850 psi. Observations were made at one minute, five minutes, and ten minutes after mixing. In FIG. 3A, the interface of the oil layer 210 and water layer 220 is at 5 mL. After mixing, an emulsion 230 is formed and the interface sits below the 2 mL mark as shown in FIG. 3B. The interface of emulsion layer 230 rises in each sample after five minutes, as shown in FIG. 3C. As shown in FIG. 3D, after ten minutes, the interface of emulsion layer 230 of Compositions 1 and 3 has returned to be slightly below 5 mL, indicating the emulsion has been effectively broken, even after aging at HPHT conditions.

Illustrative Embodiments of Suitable Compositions and Methods.

As used below, any reference to methods or products is understood as a reference to each of those methods or products disjunctively (e.g., "Illustrative embodiment 1-4 is understood as illustrative embodiment 1, 2, 3, or 4.").

Illustrative embodiment 1 is a method comprising providing a treatment fluid comprising a penetrating agent comprising 25 to 55 weight percent ethoxylated C12-C16 alcohols, 8 to 12 weight percent 2-ethyl hexanol, 18 to 55 weight percent isopropyl alcohol, and up to 35 weight percent water and a carrier fluid, and introducing the treatment fluid into a subterranean formation.

Illustrative embodiment 2 is the method of any preceding or subsequent illustrative embodiment, wherein the penetrating agent comprises: 35 to 40 weight percent ethoxylated C12-C16 alcohols, 8 to 12 weight percent 2-ethyl hexanol, 20 to 32 weight percent isopropyl alcohol, and 22 to 34 weight percent water.

Illustrative embodiment 3 is the method of any preceding or subsequent illustrative embodiment, wherein the ethoxylated C12-C16 alcohols comprise: 28 to 33 weight percent C12-C16 polyoxyethylene (6) and 8 to 10 weight percent polyoxyethylene (4) lauryl ether.

Illustrative embodiment 4 is the method of any preceding or subsequent illustrative embodiment, wherein the ethoxylated C12-C16 alcohols comprise C12-C16 polyoxyethylene (6).

Illustrative embodiment 5 is the method of any preceding or subsequent illustrative embodiment, wherein the ethoxylated C12-C16 alcohols comprise up to 10 weight percent ethoxylated C12 alcohol.

Illustrative embodiment 6 is the method of any preceding or subsequent illustrative embodiment, wherein the ethoxylated C12 alcohol is polyoxyethylene (4) lauryl ether.

Illustrative embodiment 7 is the method of any preceding or subsequent illustrative embodiment, wherein the ethoxylated C12-C16 alcohols comprise up to 98 weight percent ethoxylated C12 alcohol.

Illustrative embodiment 8 is the method of any preceding or subsequent illustrative embodiment, wherein the ethoxylated C12-C16 alcohols comprise 60-71 weight percent ethoxylated C12 alcohol, 21-30 weight percent ethoxylated C14 alcohol, and 4-12 weight percent ethoxylated C16 alcohol method Illustrative embodiment 9 is the method of any preceding or subsequent illustrative embodiment, wherein the treatment fluid is substantially free of ethylene glycol monobutyl ether and nonylphenol ethoxylates.

Illustrative embodiment 10 is the method of any preceding or subsequent illustrative embodiment, wherein the penetrating agent further comprises ethoxylated C10 alcohols.

Illustrative embodiment 11 is the method of any preceding or subsequent illustrative embodiment, wherein the treatment fluid has a cloud point of 0° C. or less.

Illustrative embodiment 12 is the method of any preceding illustrative embodiment, wherein the treatment fluid has a cloud point of −11° C. or less.

Illustrative embodiment 13 is a method comprising adding a penetrating agent comprising ethoxylated C12-C16 alcohols, 2-ethyl hexanol, and isopropyl alcohol to a carrier fluid to form a treatment fluid, introducing the treatment fluid into a subterranean formation, and reducing surface tension at an oil/water interface within the formation.

Illustrative embodiment 14 is the method of any preceding or subsequent illustrative embodiment, wherein the ethoxylated C12-C16 alcohols comprise 25 to 45 weight percent C12-C16 polyoxyethylene (6).

Illustrative embodiment 15 is the method of any preceding or subsequent illustrative embodiment, wherein the ethoxylated C12-C16 alcohols comprise up to 10 weight percent polyoxyethylene (4) lauryl ether.

Illustrative embodiment 16 is the method of any preceding or subsequent illustrative embodiment, wherein the treatment fluid is substantially free of ethylene glycol monobutyl ether and nonylphenol ethoxylates.

Illustrative embodiment 17 is the method of any preceding or subsequent illustrative embodiment, wherein the carrier fluid comprises water, brine, a hydrocarbon fluid, or an acidic solution.

Illustrative embodiment 18 is the method of any preceding or subsequent illustrative embodiment, further comprising reducing or preventing water-in-oil emulsion formation during stimulation applications.

Illustrative embodiment 19 is the method of any preceding or subsequent illustrative embodiment, wherein a temperature of the treatment fluid is greater than 90° C.

Illustrative embodiment 20 is the method of any preceding or subsequent illustrative embodiment, wherein a temperature of the treatment fluid is up to 175° C.

Illustrative embodiment 21 is the method of any preceding illustrative embodiment, wherein a pH of the treatment fluid is less than 2.

Illustrative embodiment 22 is a treatment fluid comprising a penetrating agent comprising 25 to 55 weight percent ethoxylated C12-C16 alcohols, 8 to 12 weight percent 2-ethyl hexanol, 18 to 55 weight percent isopropyl alcohol, and up to 35 weight percent water, and a carrier fluid.

Illustrative embodiment 23 is the treatment fluid of any preceding or subsequent illustrative embodiment, wherein the ethoxylated C12-C16 alcohols comprise 28 to 33 weight percent C12-C16 polyoxyethylene (6) and 8 to 10 weight percent polyoxyethylene (4) lauryl ether.

Illustrative embodiment 24 is the treatment fluid of any preceding or subsequent illustrative embodiment, wherein the carrier fluid comprises water, brine, a hydrocarbon fluid, or an acidic solution.

Illustrative embodiment 25 is the treatment fluid of any preceding or subsequent illustrative embodiment, wherein a pH of the treatment fluid is less than 2.

Illustrative embodiment 26 is the treatment fluid of any preceding illustrative embodiment, wherein the penetrating agent is substantially free of ethylene glycol monobutyl ether and nonylphenol ethoxylates.

Definitions and Descriptions

The terms "disclosure," "the disclosure," "the present disclosure," "embodiment," "certain embodiment" and the like are used herein are intended to refer broadly to all the subject matter of this patent application and the claims below. Statements containing these terms should be understood not to limit the subject matter described herein or to limit the meaning or scope of the patent claims below. The terms "comprising," "having," "including," and "containing" are to be construed as open-ended terms (i.e., meaning "including, but not limited to") unless otherwise noted. It is further noted that, as used in this specification, the singular forms "a," "an," and "the" include plural referents unless expressly and unequivocally limited to one referent.

Various embodiments of the present disclosure have been described herein. It should be recognized that these embodiments are merely illustrative of the present disclosure. Variations of those preferred embodiments may become apparent to those of ordinary skill in the art upon reading the foregoing description. The inventors expect skilled artisans to employ such variations as appropriate, and the inventors intend for the present disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the present disclosure unless otherwise indicated or otherwise clearly contradicted by context.

What is claimed is:

1. A method comprising:
   providing a treatment fluid comprising:
      a penetrating agent comprising:
         25 to 55 weight percent ethoxylated C12-C16 alcohols;
         8 to 12 weight percent 2-ethyl hexanol;
         18 to 55 weight percent isopropyl alcohol; and
         up to 35 weight percent water, and
      a carrier fluid, wherein the treatment fluid has a cloud point of 0° C. or less; and
   introducing the treatment fluid into a subterranean formation.

2. The method of claim 1, wherein the penetrating agent comprises:
   35 to 40 weight percent ethoxylated C12-C16 alcohols;
   8 to 12 weight percent 2-ethyl hexanol;
   20 to 32 weight percent isopropyl alcohol; and
   22 to 34 weight percent water.

3. The method of claim 2, wherein the ethoxylated C12-C16 alcohols comprise:
   28 to 33 weight percent C12-C16 polyoxyethylene (6); and
   8 to 10 weight percent polyoxyethylene (4) lauryl ether.

4. The method of claim 1, wherein the ethoxylated C12-C16 alcohols comprise C12-C16 polyoxyethylene (6).

5. The method of claim 1, wherein the ethoxylated C12-C16 alcohols comprise up to 10 weight percent ethoxylated C12 alcohol.

6. The method of claim 5, wherein the ethoxylated C12 alcohol is polyoxyethylene (4) lauryl ether.

7. The method of claim 1, wherein the ethoxylated C12-C16 alcohols comprise up to 98 weight percent ethoxylated C12 alcohol.

8. The method of claim 1, wherein the ethoxylated C12-C16 alcohols comprise 60-71 weight percent ethoxylated C12 alcohol, 21-30 weight percent ethoxylated C14 alcohol, and 4-12 weight percent ethoxylated C16 alcohol.

9. The method of claim 1, wherein the treatment fluid is substantially free of ethylene glycol monobutyl ether and nonylphenol ethoxylates.

10. The method of claim 1, wherein the penetrating agent further comprises ethoxylated C10 alcohols.

11. The method of claim 1, further comprising reducing surface tension at an oil/water interface within the formation.

12. The method of claim 1, wherein the ethoxylated C12-C16 alcohols comprise 25 to 45 weight percent polyoxyethylene (4) lauryl ether.

13. The method of claim 1, wherein the ethoxylated C12-C16 alcohols comprise up to 10 weight percent polyoxyethylene (4) lauryl ether.

14. The method of claim 1, further comprising reducing or preventing water-in-oil emulsion formation during stimulation applications.

15. The method of claim 1, wherein a temperature of the treatment fluid is greater than 90° C.

16. The method of claim 1, wherein a temperature of the treatment fluid is up to 175° C.

17. The method of claim 1, wherein the treatment fluid has a pH of less than 2.

18. The method of claim 1, wherein the penetrating agent comprises 41 to 55 weight percent ethoxylated C12-C16 alcohols.

19. The method of claim 1, wherein the treatment fluid has a cloud point of −10° C. or less.

20. The method of claim 1, wherein the treatment fluid has a surface tension of less than or about 28.7 and more than or about 26.7.

* * * * *